S. G. STARLING AND A. J. HUGHES.
ANEMOMETER.
APPLICATION FILED APR. 10, 1919.
1,352,391.
Patented Sept. 7, 1920.
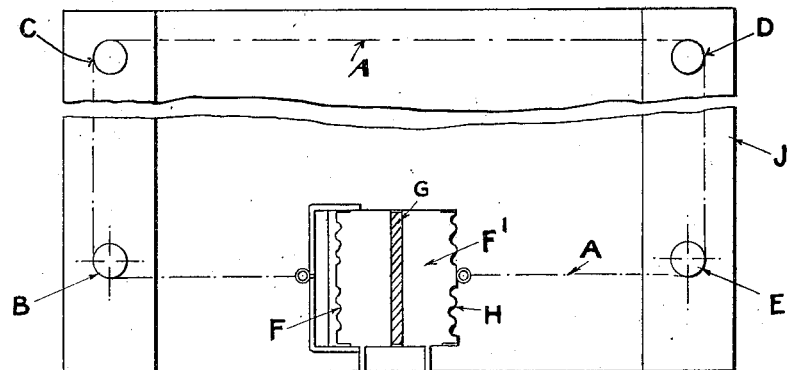
FIG. 1.
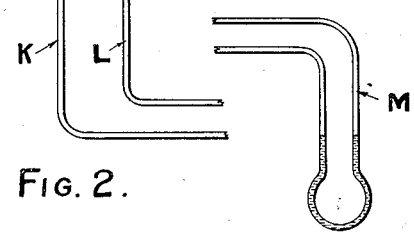
FIG. 2.
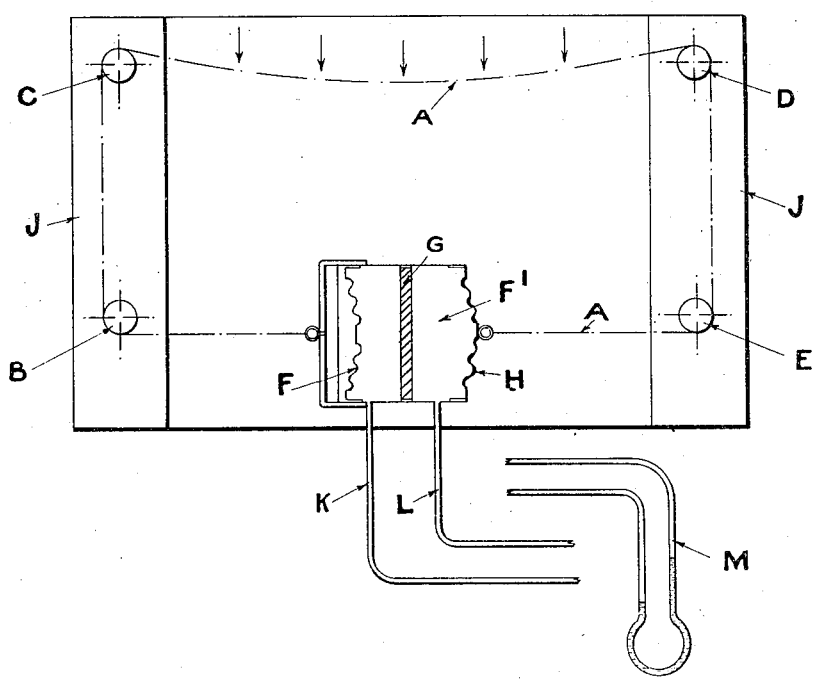
Inventors.
Sydney George Starling and
Arthur Joseph Hughes.
by Wilkinson & Giusto
Attorneys.

UNITED STATES PATENT OFFICE.

SYDNEY GEORGE STARLING, OF FOREST GATE, AND ARTHUR JOSEPH HUGHES, OF LONDON, ENGLAND, ASSIGNORS TO HENRY HUGHES AND SON LIMITED, OF LONDON, ENGLAND, A CORPORATION OF ENGLAND.

ANEMOMETER.

1,352,391.      Specification of Letters Patent.      Patented Sept. 7, 1920.

Application filed April 10, 1919. Serial No. 289,066.

*To all whom it may concern:*

Be it known that we, SYDNEY GEORGE STARLING, of 61 Windsor Road, Forest Gate, in the county of Essex, England, and ARTHUR JOSEPH HUGHES, of 59 Fenchurch street, in the city and county of London, England, both subjects of the King of Great Britain, have invented a new and useful Improved Anemometer, of which the following is a specification.

This invention relates to an improved anemometer or instrument for measuring the velocity of wind or conversely for measuring the velocity of any body relatively to the air through which it is moving.

According to this invention a flexible wire or cord is drawn taut or slightly stretched between suitable supports and is exposed to the air at right angles to the direction of motion thereof. The pressure of air due to its velocity relatively to the wire or cord bends the said wire or cord and thus produces an increased tension therein and this increase of tension is a measure of the velocity of the air relatively to the wire or cord.

Variations of the tension in the wire or cord can be conveniently indicated by connecting one end of the wire or cord to a closed box or drum having a central partition wall, its outer walls being made elastic, and the other end of the wire being fixed to the rigid body of the box or drum so that variations of tension in the wire or cord cause variations in the shape of one elastic wall, and thereby vary the pressure in the closed box, which can be indicated by a manometer.

In the accompanying drawing, we have shown how our said invention may be conveniently and advantageously carried into practice. In this drawing:—

Figures 1 and 2 are diagrammatic plan views of an anemometer constructed according to our invention, these figures respectively showing the flexible wire in the positions which it assumes when free and when subjected to wind pressure.

A is a flexible connector preferably made of wire which passes over suitable guides, such as the guide rollers B, C, D and E, in such a manner that the portion between the rollers C, D is exposed to the action of air moving in a direction transverse thereto, for example it may be supported on the underside of the wing of an aeroplane.

One end of the wire A is fixed to the rigid body of the metal drum F, which has a central partition wall G, its outer walls being made elastic, e. g., similar to the corrugated elastic wall of the vacuum box of an aneroid barometer, and to one elastic wall there is secured the other end of the wire A. By this means, the effects of variations of temperature and barometric pressure on the fluid columns may be eliminated. The rollers B, C, D, E and the drum F are fixed to a rigid support J, so as to retain their relative positions. If desired, the portions of the wire between the rollers B, E, and the drum F may also be exposed to the action of the relatively moving air.

The interior spaces of the drum between the walls F, G, H, are respectively connected through metal tubes K, L, to the limbs of a manometer M, which may be in any convenient position, if desired at a distance from the wire A, e. g., opposite the pilot's seat in aircraft. The manometer scale may be graduated to give direct readings of the velocity of air relatively to the wire or cord, for example the points on the scale may be determined experimentally.

In operation, when the wire A is motionless, the part between the rollers C, D, is straight and the mercury columns in the limbs of the manometer stand at the same height, see Fig. 1. When however the wire A moves relatively to the air, it is bent inward by the air pressure, as indicated in Fig. 2; the tension in the wire is thus increased so as to pull outward the elastic wall H of the drum F and reduce the pressure in the internal chamber on the right hand side, thereby causing the mercury to rise in the column of the manometer connected thereto, the air velocity corresponding to this rise being then read off on the scale.

What we claim as our invention and desire to secure by Letters Patent is:—

1. An anemometer comprising a flexible lineal connector supported under tension and arranged to yield to transversely directed air currents, and means for indicating variations in the tension of said connector.

2. An anemometer comprising a series of supports spaced apart, a flexible lineal connector passing over said supports and held under tension, but arranged to yield to transversely directed air currents, and means for indicating variations in the tension of said connector.

3. An anemometer comprising a series of rollers spaced apart, a flexible lineal connector passing over said rollers and held under tension, but arranged to yield to transversely directed air currents, and means for indicating variations in the tension of said connector.

4. An anemometer comprising a closed box separated by a partition into two chambers, flexible resilient diaphragms closing the opposite chambers of said box, a liquid manometer having its limbs connected, respectively, to said chambers, and a flexible connector connected at one end to one of said diaphragms and at the other end to a fixed part of the frame, and adapted to be flexed by transverse currents of air, substantially as described.

5. An anemometer comprising a frame, a closed box carried by said frame and separated by a partition into two chambers, flexible diaphragms closing the opposite chambers of said box, a liquid manometer having its limbs connected, respectively, to said chambers, rollers mounted on said frame and spaced apart thereon, a flexible connector passing over said rollers and connected at one end to one of said diaphragms and at the other end to a fixed part of the frame and adapted to be flexed by transverse currents of air, substantially as described.

SYDNEY GEORGE STARLING.
ARTHUR JOSEPH HUGHES.